(12) United States Patent    (10) Patent No.: US 6,721,581 B1
Subramanian                      (45) Date of Patent: Apr. 13, 2004

(54) REPROGRAMMABLE DIGITAL WIRELESS COMMUNICATION DEVICE AND METHOD OF OPERATING SAME

(75) Inventor: Ravi Subramanian, Mountain View, CA (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/565,687

(22) Filed: May 5, 2000

Related U.S. Application Data

(60) Provisional application No. 60/133,129, filed on May 7, 1999, provisional application No. 60/133,135, filed on May 7, 1999, provisional application No. 60/133,137, filed on May 7, 1999, and provisional application No. 60/133,141, filed on May 7, 1999.

(51) Int. Cl.[7] .............................. H04M 1/00; H04L 5/16
(52) U.S. Cl. .................... 455/575.1; 455/550; 455/419; 375/219; 375/222
(58) Field of Search ................................. 455/550, 552, 455/557, 575, 87, 542, 323, 419; 375/219, 222, 220, 316

(56) References Cited

U.S. PATENT DOCUMENTS

| 5,539,479 | A | | 7/1996 | Bertram |
| 5,872,810 | A | * | 2/1999 | Philips et al. ................ 375/222 |
| 5,974,312 | A | * | 10/1999 | Hayes et al. ................ 455/419 |
| 6,011,976 | A | * | 1/2000 | Michaels et al. ............ 455/466 |
| 6,052,600 | A | * | 4/2000 | Fette et al. .................. 455/509 |
| 6,415,384 | B1 | * | 7/2002 | Dave ........................... 713/100 |

* cited by examiner

Primary Examiner—William Trost
Assistant Examiner—Sharad Rampuria
(74) Attorney, Agent, or Firm—Darby & Darby

(57) ABSTRACT

A digital wireless communication device comprises a software-programmable processor, a heterogeneous reconfigurable multiprocessing logic circuit, and a bus connecting the software-programmable processor and the heterogeneous reconfigurable multiprocessing logic circuit. The heterogeneous reconfigurable multiprocessing logic circuit comprises a set of heterogeneous signal processing kernels and a reconfigurable data router interconnecting the heterogeneous signal processing kernels. The software-programmable processor is selected from the group comprising: a digital signal processor and a central processing unit. The architecture provides the ability to reconfigure a single product platform for multiple standards, applications, services, and quality-of service, instead of developing multiple hardware platforms to establish the same collective functionality. The architecture also provides the ability to use software programming techniques to reduce product development time and achieve rapid and comprehensive product customization. The invention extends the performance efficiency of microprocessors and digital signal processors via the augmentation of data paths and control paths through a reconfigurable co-processing machine. The reconfigurability of the data path optimizes the performance of the data flow in the algorithms implemented on the processor.

11 Claims, 20 Drawing Sheets

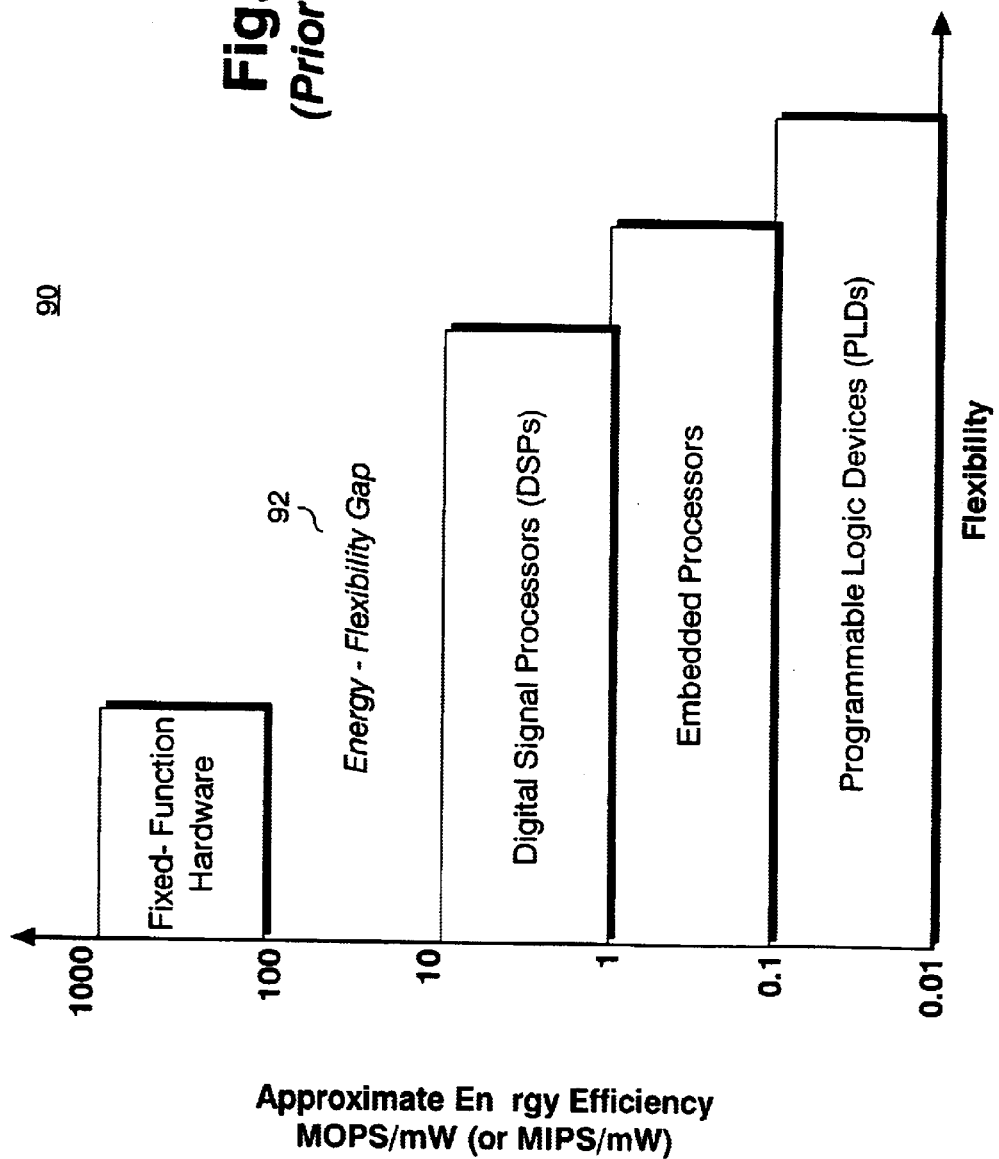

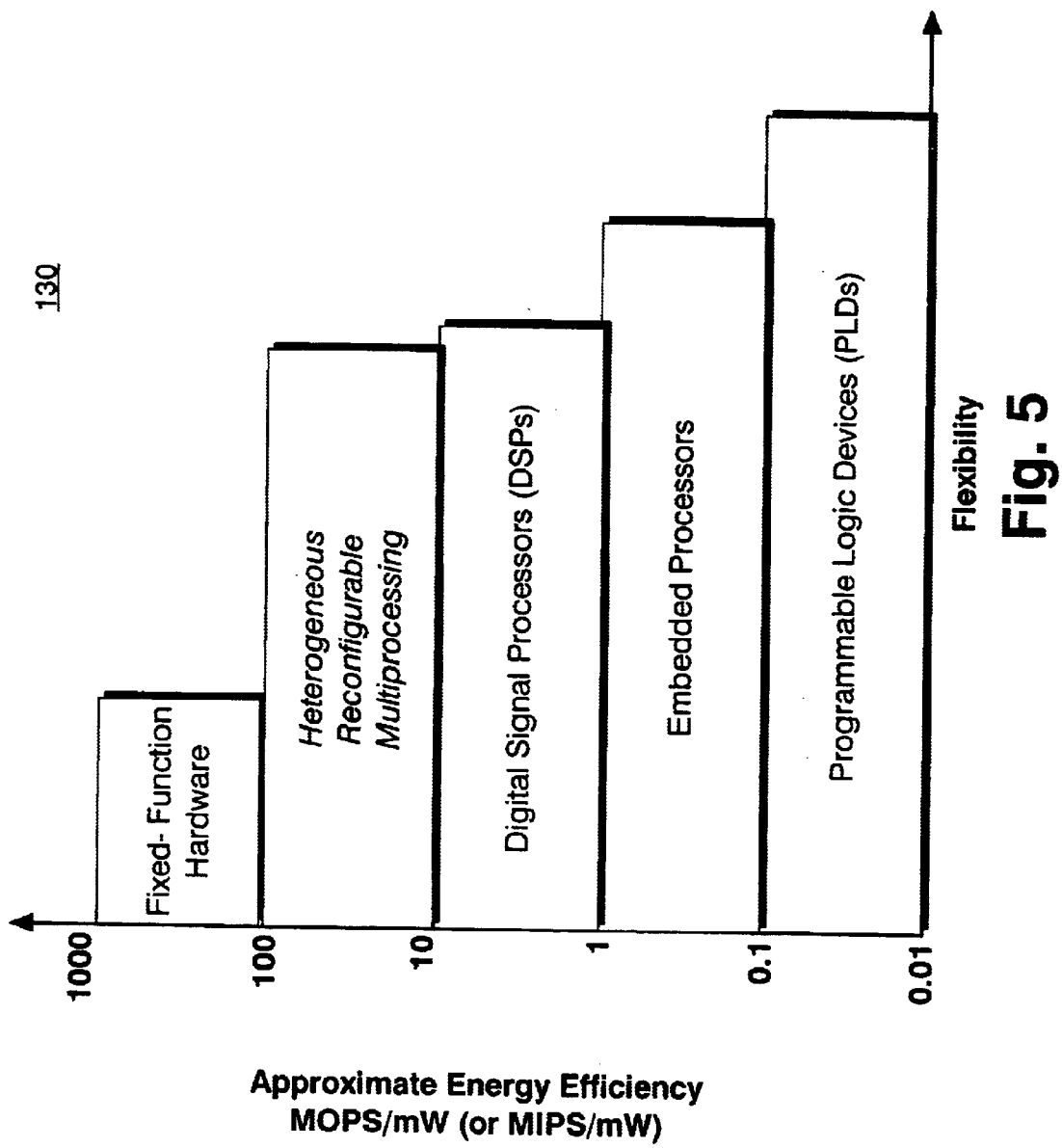

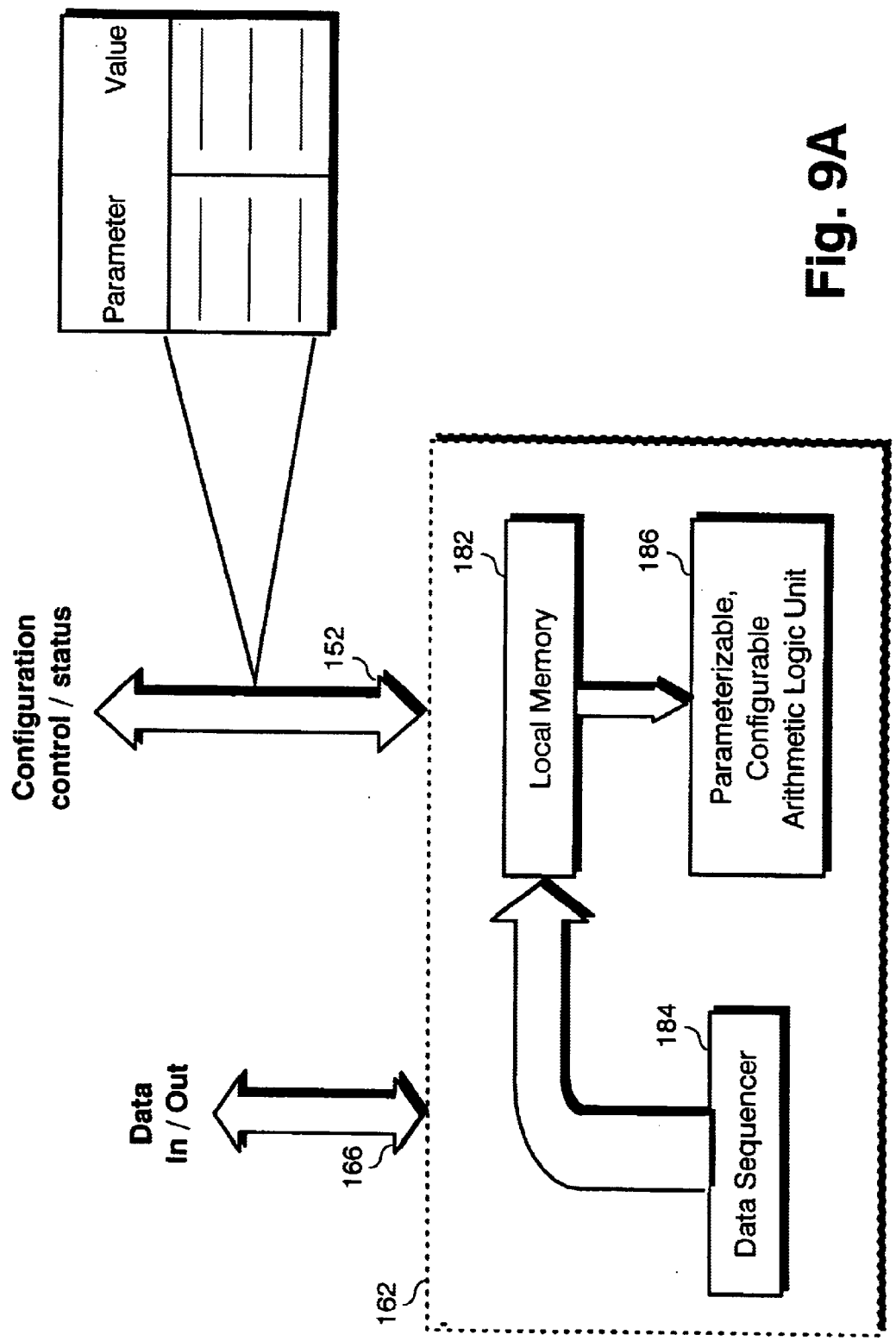

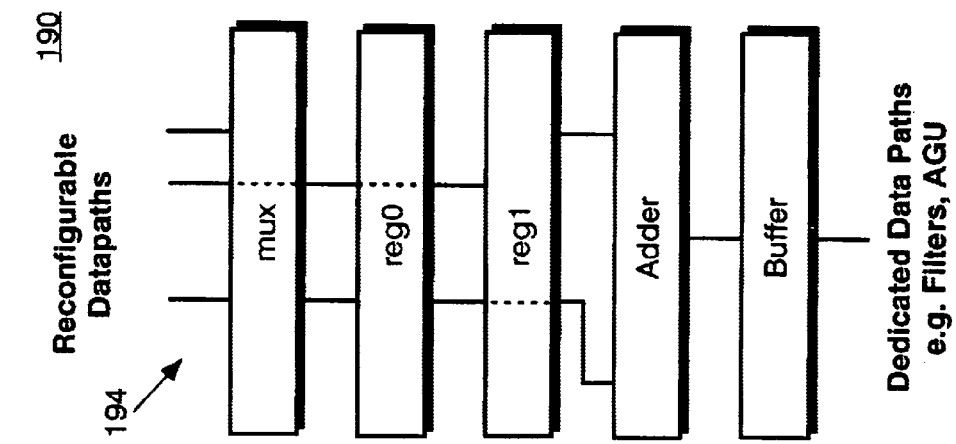
Fig. 9B(2)
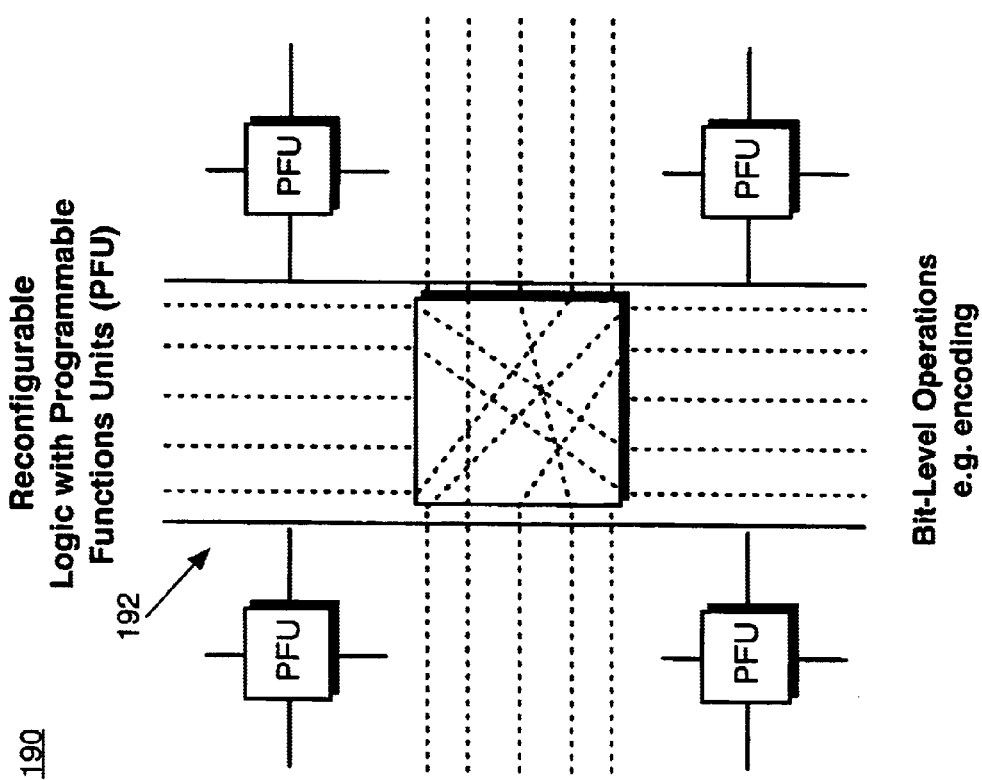
Fig. 9B(1)

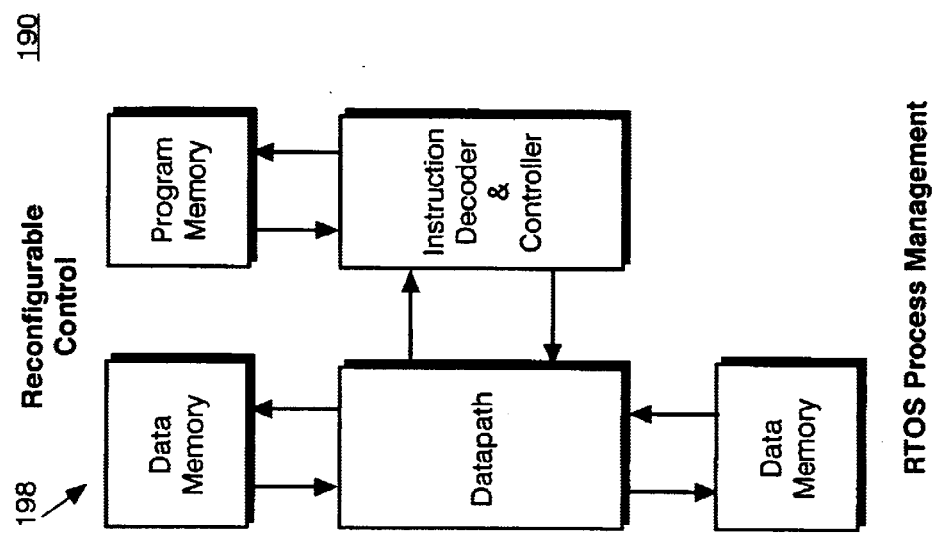
Fig. 9B(4)
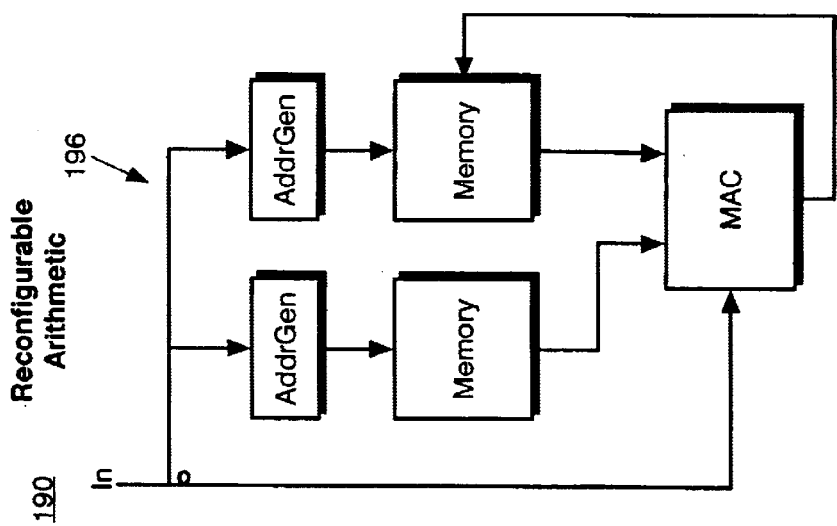
Fig. 9B(3)

| Parameter Estimation Functions | TDMA | | | |
|---|---|---|---|---|
| | IS136 | GSM | GPRS | EDGE |
| LMS Channel Estimator | | x | x | x |
| Windowed Average Energy Estimator | x | x | x | x |
| ML Symbol Timing Estimator | x | x | x | x |
| ML Carrier Phase Estimator | x | | | |
| PN Correlator | | | | |
| Matched Filter | | | | |
| Interference Energy Estimator | | | | |

| Parameter Estimation Functions | CDMA | | | | |
|---|---|---|---|---|---|
| | IS-95B | IS-2000 | WCDMA-FDD | GPS | GLOBALSTAR |
| LMS Channel Estimator | | | x | | |
| Windowed Average Energy Estimator | x | x | x | x | x |
| ML Symbol Timing Estimator | x | x | x | x | x |
| ML Carrier Phase Estimator | x | x | x | | |
| PN Correlator | | | x | x | x |
| Matched Filter | | | x | | |
| Interference Energy Estimator | | x | | | |

Fig. 11

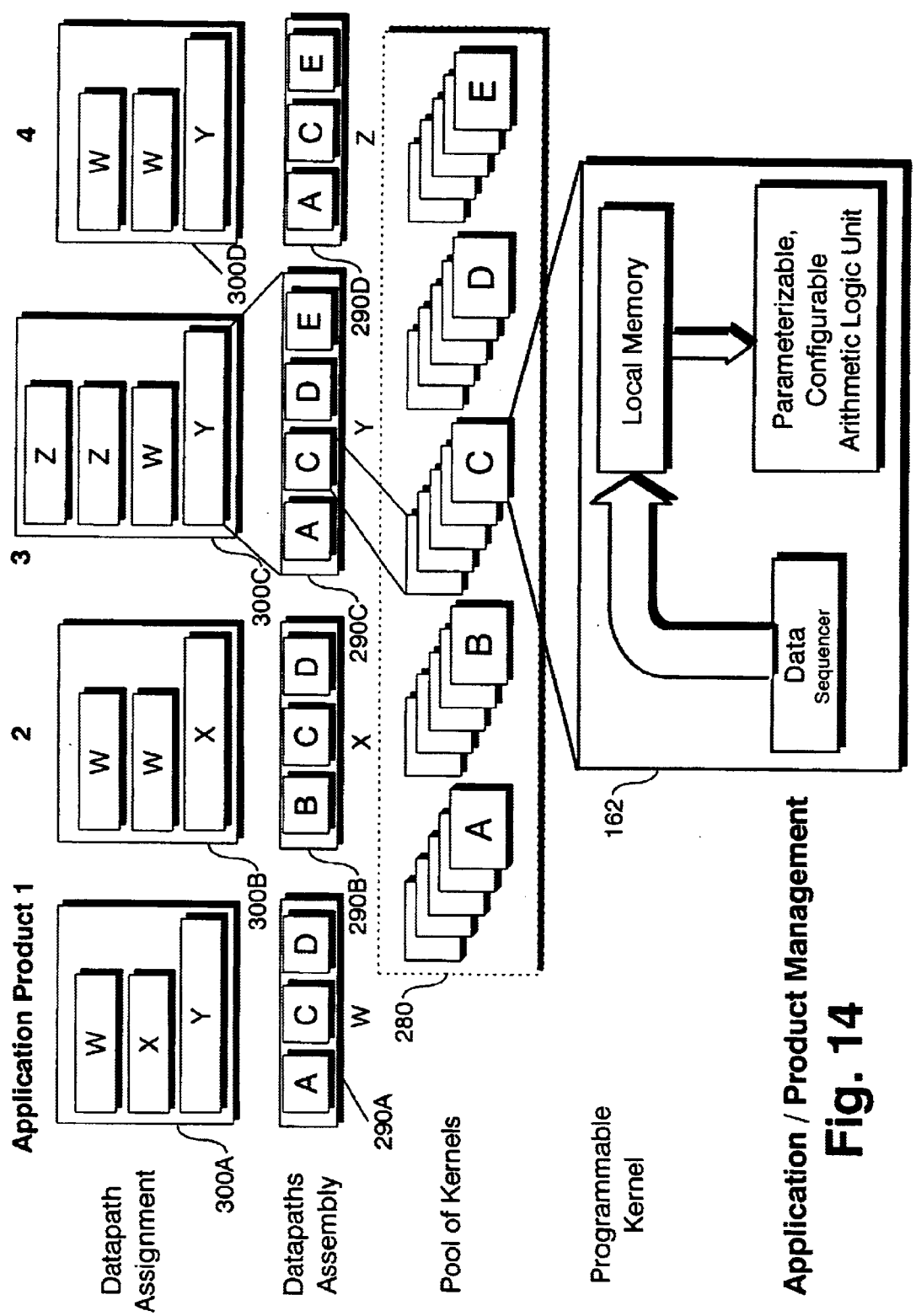

REPROGRAMMABLE DIGITAL WIRELESS COMMUNICATION DEVICE AND METHOD OF OPERATING SAME

This application claims priority to the provisional patent applications with the following Ser. Nos.: 60/133,141; 60/133,137; 60/133,129; and 60/133,135, each of which was filed on May 7, 1999.

BRIEF DESCRIPTION OF THE INVENTION

This invention relates generally to wireless communication devices. More particularly, this invention relates to a reconfigurable digital wireless communication device.

BACKGROUND OF THE INVENTION

Existing communication devices are "static" devices. That is, they are designed to support a specific wireless communication standard and/or to support a specific application (e.g., voice, data transmission) at a specific data rate. Typically, different wireless communication standards are used in different wireless networks, both within a geographic locality and worldwide. Thus, an individual traveling between different regions is required to use a separate wireless communication device in each region.

In addition, the advent of new and evolving user applications and services may necessitate redesign of static wireless communication infrastructure and terminals. Thus, an individual or service provider who wants to utilize or enable such services is required to replace or upgrade equipment.

FIG. 1 illustrates a digital communication modem 20 that may be implemented in accordance with prior art approaches to multi-standard communication devices. A transmitter 22 transmits a signal to a channel 24, which may be a wireless or physical channel. The transmitted signal is received at the modem 20, where it is initially processed by a Radio Frequency (RF) subsystem 26. The RF subsystem 26 performs analog mixing, analog filtering, and analog gain control functions. The analog signal from the RF subsystem 26 is then converted to an equivalent digital signal by an analog-to-digital converter 28.

The digital signal is then processed by a digital front-end processing circuit 30, which performs standard-specific, channel-specific, and modulation-specific bandwidth selection, filtering, sampling-rate control and other signal processing. The signal from the digital front-end processing circuit 30 is then passed to a detector/demodulator circuit 32, which performs signal detection and demodulation operations. The detection and demodulation circuit 32 also interacts with a parameter estimation circuit 34. The output from the detection and demodulation circuit 32 is subsequently processed by a channel decoder 36 and then a source decoder 38.

FIG. 2A shows a prior art architecture for implementing the structure of FIG. 1. An RF subsystem 26 is again used to provide one or more bandpass signals (intermediate frequency signals), which are then digitized by the analog-to-digital converter 28, which is typically implemented as a free-running analog-to-digital converter. The output from the analog-to-digital converter 28 is placed on a bus 52. Signals from the bus 52 are routed to hardware processors 60 and software programmable processors 70. The hardware processors include programmable logic device 62 and fixed-function logic 64. The software programmable processors include digital signal processor 72 and microprocessor 74.

The digital components (30, 32, 34, 36, and 38) of the device 20 are typically implemented on software-programmable processors 70, or as a fully hardwired, non-programmable application-specific integrated circuit 64. The hardwired circuit may be augmented by a programmable logic device 62, which provides limited fine-granularity programmability. The device 50 of FIG. 2A facilitates the management of functions executing on the programmable logic device 62 via controlling the download of functionality into the programmable logic device 62 and control of the dataflow into and out of the programmable logic device 62. The software-programmable processors 70 typically comprises a digital signal processor 72 and a control microprocessor 74. For lower bandwidth applications (tens of kbps), software-programmable digital signal processors 72 are typically used to perform requisite signal processing functions. For high bandwidth applications (tens of Mbps), a fully hardwired approach is typically employed. The general purpose microprocessor 74 typically performs control and other functions. Accordingly, the signal processing device 50 can be highly optimized only for a particular communication standard, service and application. Prior art approaches to accommodating multiple standards, services and applications have essentially consisted of combining the disparate hardware and software resources separately optimized for each service of interest. This results in poor efficiency in terms of size, weight and power consumption.

FIG. 2B illustrates the control architecture 80 for a prior art multi-standard communication apparatus. The architecture 80 includes executive code 88, which is effectively an operating system running on microprocessor 74 or digital signal processor 72. One of a suite of applications 84 is selected to run under the operating system. Each application 84 executes a set of software/hardware functions 82A–C. Each application 84 requires computation resources, which are available according to FIG. 2A, either via a microprocessor, a digital signal processor, a fixed-function logic engine, or a programmable logic engine. Thus, each of the applications requires some combination of these resources; the actual partitioning among their use is determined by the product/application requirements. For example, operation on a portable device favors much of the functionality being implemented on dedicated, fixed-function hardwired logic devices. On the other hand, product flexibility and upgrade-ability requires use of completely programmable components in the platform, such as microprocessors, digital signal processors, and programmable logic. The approach of FIG. 2B is also inefficient, as it essentially relies upon sequentially selecting one of the sets of disparate and redundant hardware and software resources discussed in connection with FIG. 2A.

The poor efficiency of the prior art approaches discussed is evident from FIG. 3, which depicts energy efficiency vs. flexibility for the various architectural elements of device 50. The highly efficient fixed-hardware resources are highly inflexible, so that considerable replication (and therefore redundancy) is incurred. At the opposite extreme, the highly flexible programmable logic devices, embedded processors and software-programmable digital signal processors (DSPs) that may be employed are inefficient with respect to power and size. These design tradeoffs result in the Energy-Efficiency Gap 92 shown in FIG. 3.

In view of the foregoing, it would be highly desirable to provide a single wireless communication device that can efficiently and cost-effectively support multiple wireless communication standards and applications.

SUMMARY OF THE INVENTION

A digital wireless communication device comprises a software-programmable processor, a heterogeneous reconfigurable multiprocessing logic circuit, and a bus connecting the software-programmable processor and the heterogeneous reconfigurable multiprocessing logic circuit. The software-programmable processor is selected from the group comprising: a digital signal processor and a central processing unit. The heterogeneous reconfigurable multiprocessor comprises a set of heterogeneous signal processing kernels and a reconfigurable data router interconnecting the heterogeneous signal processing kernels. The signal processing kernels and data router are controlled by the software-programmable processor via control busses. The design of the heterogeneous reconfigurable multiprocessor is aided by an analysis method referred to as profiling.

The invention establishes a new architecture for multiple-service, multiple-standard digital communication devices. The platform enables the same hardware resources to be reconfigured in order to provide more flexible delivery of arithmetic and control operations via techniques of heterogeneous reconfigurable multiprocessing. The architecture is reprogrammable through the control of software resident on or downloaded into memory, which may be used by the microprocessor, digital signal processor, or heterogeneous reconfigurable multiprocessing logic. The architecture facilitates new, broadband services over a wireless or wired communication network on a single hardware platform at the base station (infrastructure end) or the user terminal (consumer terminal end).

The invention provides a communication apparatus that can operate over a plurality of telecommunication physical layer standards, radio frequency bands, data-rates, and user-programmed or network-programmed services. The functionality of a device constructed in accordance with the invention is defined as a set of software modules, each including a combination of "personalities" for the hardware devices of the apparatus. The software modules comprise object code that executes on a microprocessor, a digital signal processor, or on a heterogeneous reconfigurable multiprocessing logic module. The invention enables the use of a single hardware platform to operate over a variety of bands, standards, and data rates, while delivering a variety of user-programmed or network-programmed services. Furthermore, the invention can be reconfigured in the factory or field through various means including but not limited to factory/point-of-sale programming, remote control, and over-the-air or over-the-network download.

Thus, the invention significantly reduces the number of product platforms required to span a large product offering space for the wired or wireless communication market.

BRIEF DESCRIPTION OF THE DRAWINGS

For a better understanding of the invention, reference should be made to the following detailed description taken in conjunction with the accompanying drawings, in which:

FIG. 3 illustrates the Energy-flexibility Gap associated with the prior art.

FIG. 5 illustrates the energy-flexibility characteristic of heterogeneous reconfigurable multiprocessing hardware constructed in accordance with the invention.

FIG. 9A illustrates a Reconfigurable Data Processing Kernel in accordance with an embodiment of the invention.

FIG. 9B illustrates configurable architectures that may be formed in accordance with an embodiment of the invention.

FIG. 11 illustrates profiling commonality of functions across standards in accordance with an embodiment of the invention.

FIG. 14 illustrates the method of configuring one or more products in accordance with an embodiment of the invention.

Like reference numerals refer to corresponding parts throughout the drawings.

DETAILED DESCRIPTION OF THE INVENTION

Figure 1:
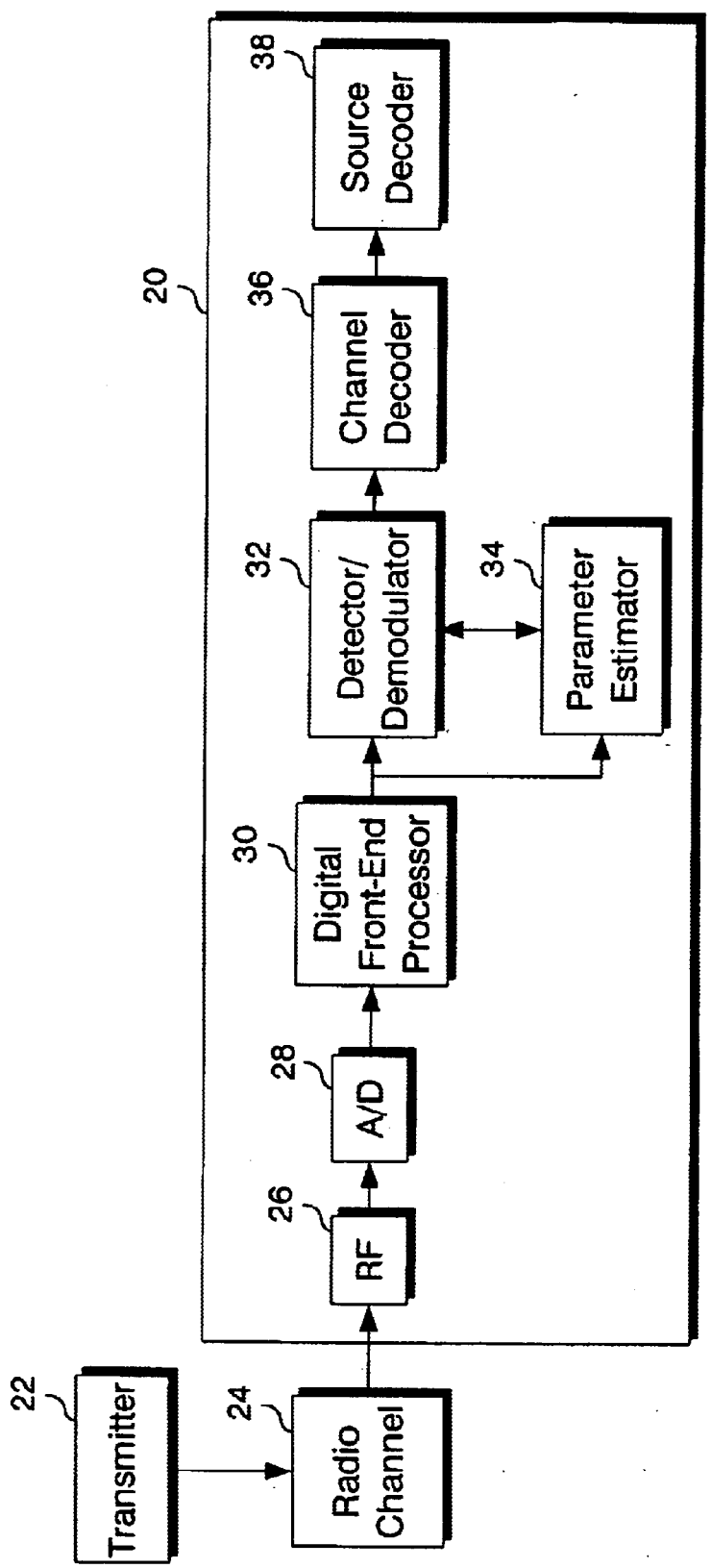
FIG. 1 illustrates a digital communication modem that may be implemented in accordance with the prior art.
Figure 2A:
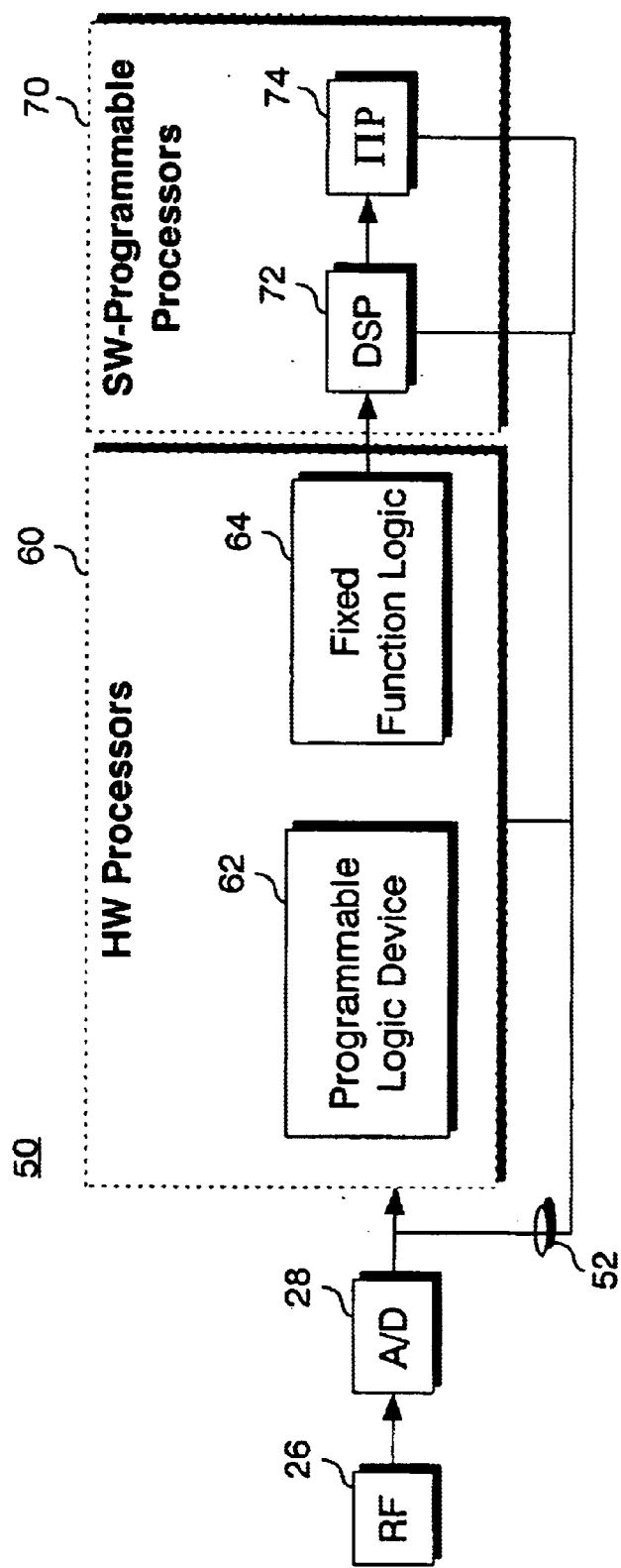
FIG. 2A illustrates an architecture used to implement a prior art digital communication modem.
Figure 2B:
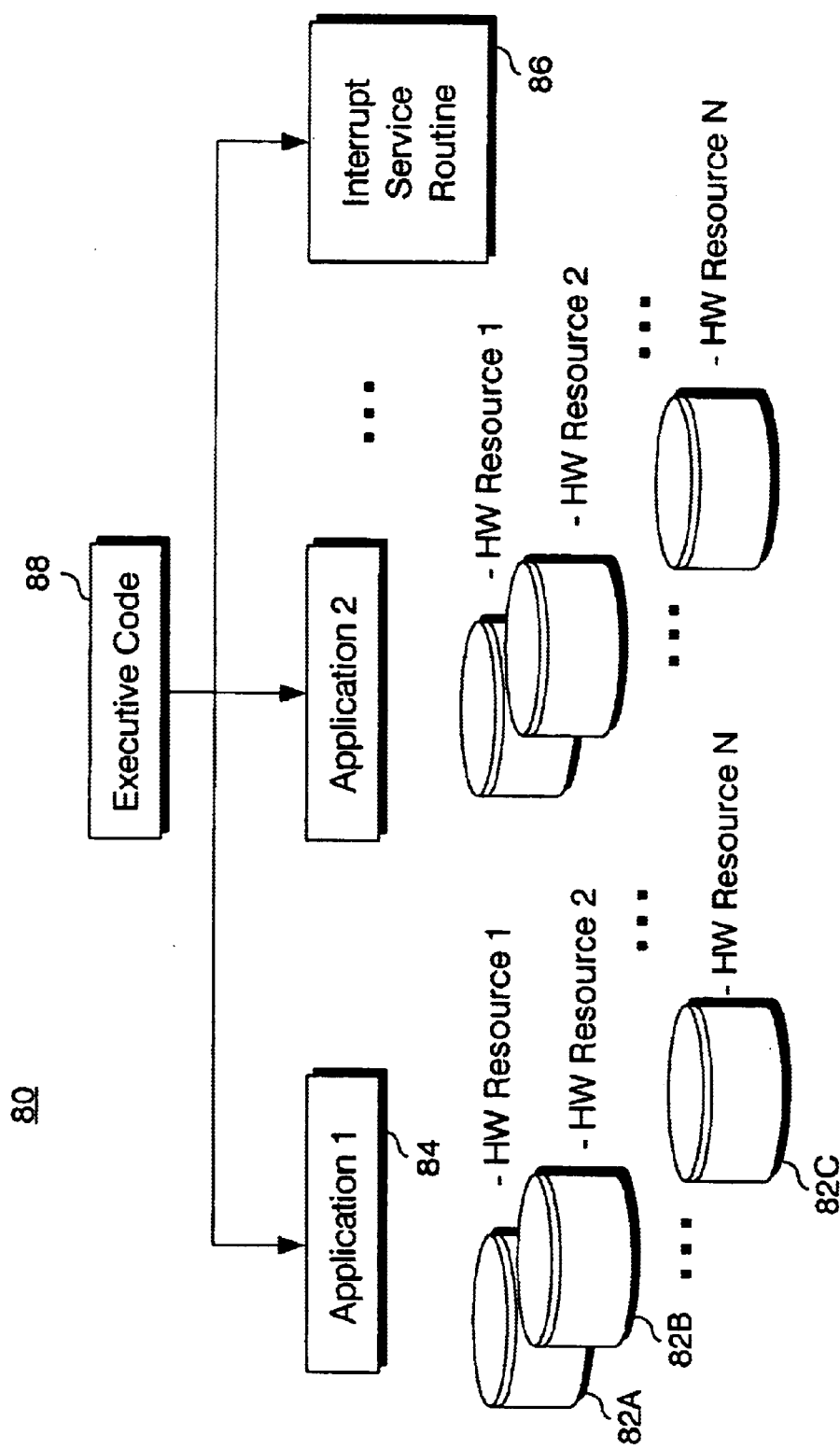
FIG. 2B illustrates a control strategy used to implement a prior art digital communication modem.

The efficiency of a multi-standard device may be dramatically improved via a software programmable processors 70. In this embodiment, processors 70 include DSP microprocessor 72 and control microprocessor 74. The new architecture exploits heterogeneous reconfigurable multiprocessor 66, which includes a pool of parallel heterogeneous hardware signal processors referred to as signal processing kernels. The kernels perform the more computationally intensive signal processing operations of a set of standards, applications and services of interest, and are selected and configured in a modular, non-redundant manner. The individual signal processing kernels and their interconnections can be quickly reconfigured, so that device 100 can quickly switch from one standard, application, and/or service of interest to another. DSP 72 performs the less computationally intensive signal processing functions, while microprocessor 74 performs control and other functions. A communication bus 52 links microprocessor 74, digital signal processor 72, and heterogeneous reconfigurable multiprocessing hardware 66. Each hardware device is controlled by a corresponding software module 110.

Figure 4A:
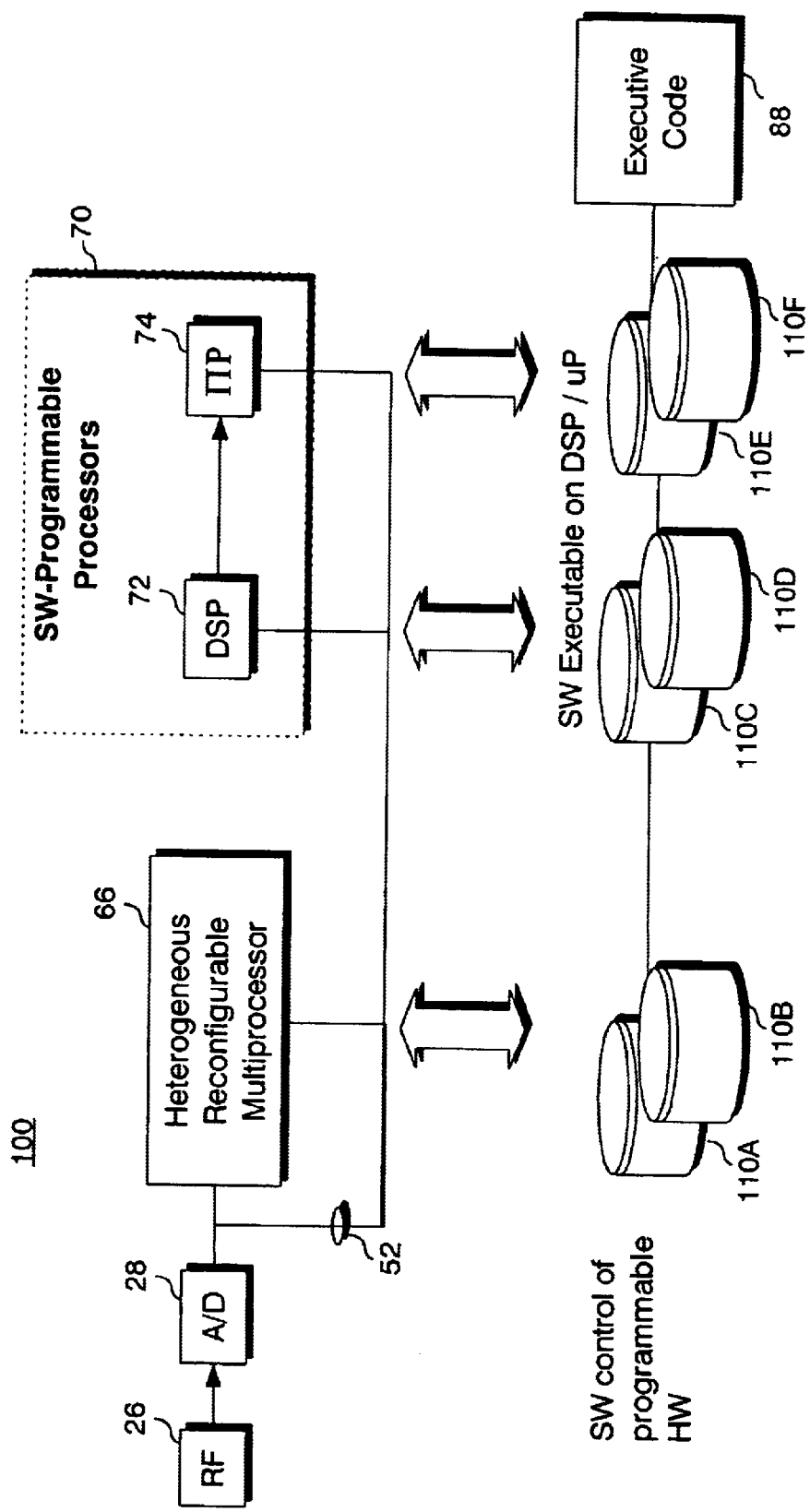
FIG. 4A illustrates a reconfigurable digital wireless communication device in accordance with an embodiment of the invention.
Figure 4B:
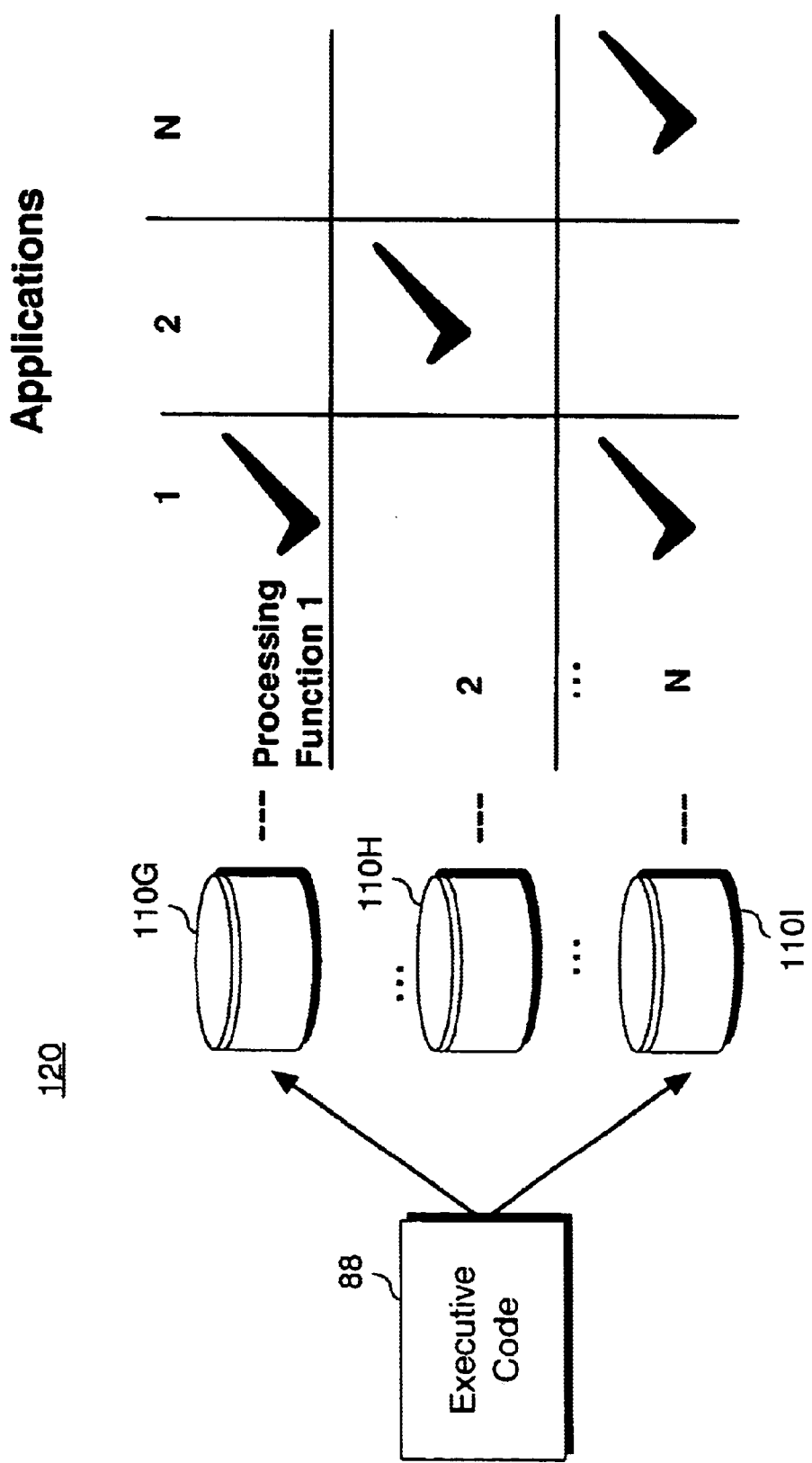
FIG. 4B illustrates a reconfiguration/control methodology used in conjunction with a reconfigurable digital wireless communication device of the invention.

The communication apparatus of the invention can change its function temporally via a mechanism that is under software control. FIG. 4B illustrates the executive code 88 and software modules 110 of the invention operating in connection with the hardware platform 100 of FIG. 4A. As shown in FIGS. 4A–B, selected software modules 110 execute on different hardware components. Thus, for example, software kernels 110A–B are executed on heterogeneous reconfigurable multiprocessing hardware 66, software kernels 110C–D are executed on the digital signal processor 72, and software kernels 110E–F are executed on the microprocessor 74. Executive code 88 further facilitates the management of the dataflow into and out of heterogeneous reconfigurable multiprocessor 66, as well as the functionality of heterogeneous reconfigurable multiprocessor 66. Thus, all the dataflow and control flow of all computational resources may be controlled and reconfigured via a software-programmable engine.

The software modules 110 define a superset of signal processing and control functions required by the suite of standards, applications, and/or services of interest, in accordance with the matrix of FIG. 4B. In one embodiment, the software modules 110 are platform-dependent, and are thus in the form of object code optimized for the platform under consideration. They reside either in the product platform memory or are downloadable over-the-network, over-the-air, on the manufacturing floor, or point-of-sale station. Typically, they are stored in a platform-dependent hierarchy matrix, wherein the hierarchy has the following form:

| | |
|---|---|
| Product-Platform X | **specifies constituent processor cores, buses, etc. |
| Country of Operation | **specifies allowed subset of applications |
| Frequency Band | **specifies allowed frequency band of operations |
| Services | **specifies allowed services in a country |
| Data-Rates | **specifies data-rate support capability |
| Layer 1 Functionality | |
| | Object code to download for platform |
| Layer 2 Functionality | |

The apparatus of FIGS. 4A–B is preferably operated in the following manner. The country of operation, allowed frequency band, allowed services, allowed data rates, etc. for a device are specified. Software modules to support these specifications are then selected. The software modules are then downloaded to the device of FIG. 4A. This may be accomplished over-the-air, over-the-network, on the manufacturing floor, or at a point-of-sale station. The software kernels are then tested on the device and the system is initialized for operation.

The resultant architecture and control strategy effectively fills the energy-efficiency gap 92 as shown in FIG. 5. Although the heterogeneous reconfigurable multiprocessor does not attain the efficiency of fixed-function hardware due to the overhead of resources used for reconfiguration (i.e., to accommodate multiple services), this overhead is minimal relative to that of the more programmable/flexible devices shown. Digital signal microprocessors and embedded processors are much less efficient, due to the overhead of supporting instruction-set programmability. The efficiency of programmable logic devices is even lower, since they must employ a majority of resources to permit general, fine-grained reconfiguration that exceeds the needs of the application space accommodated by the invention.

The criteria used to map the requisite signal processing functions into the architecture of FIG. 4A will vary, but will typically depend upon several key factors, including: power efficiency, memory requirements, throughput, latency, and flexibility. Function mapping will also rely upon product application space, multi-nation, multi-standard, or multi-service product operation requirements, product development time, and time-to-market requirements. Thus, the same hardware can be programmed and/or reconfigured to implement the same dataflow and control flow, but with a new set of parameters, that may be product quality-, channel-, standard-, service-, or country-of-operation-dependent.

Figure 6:
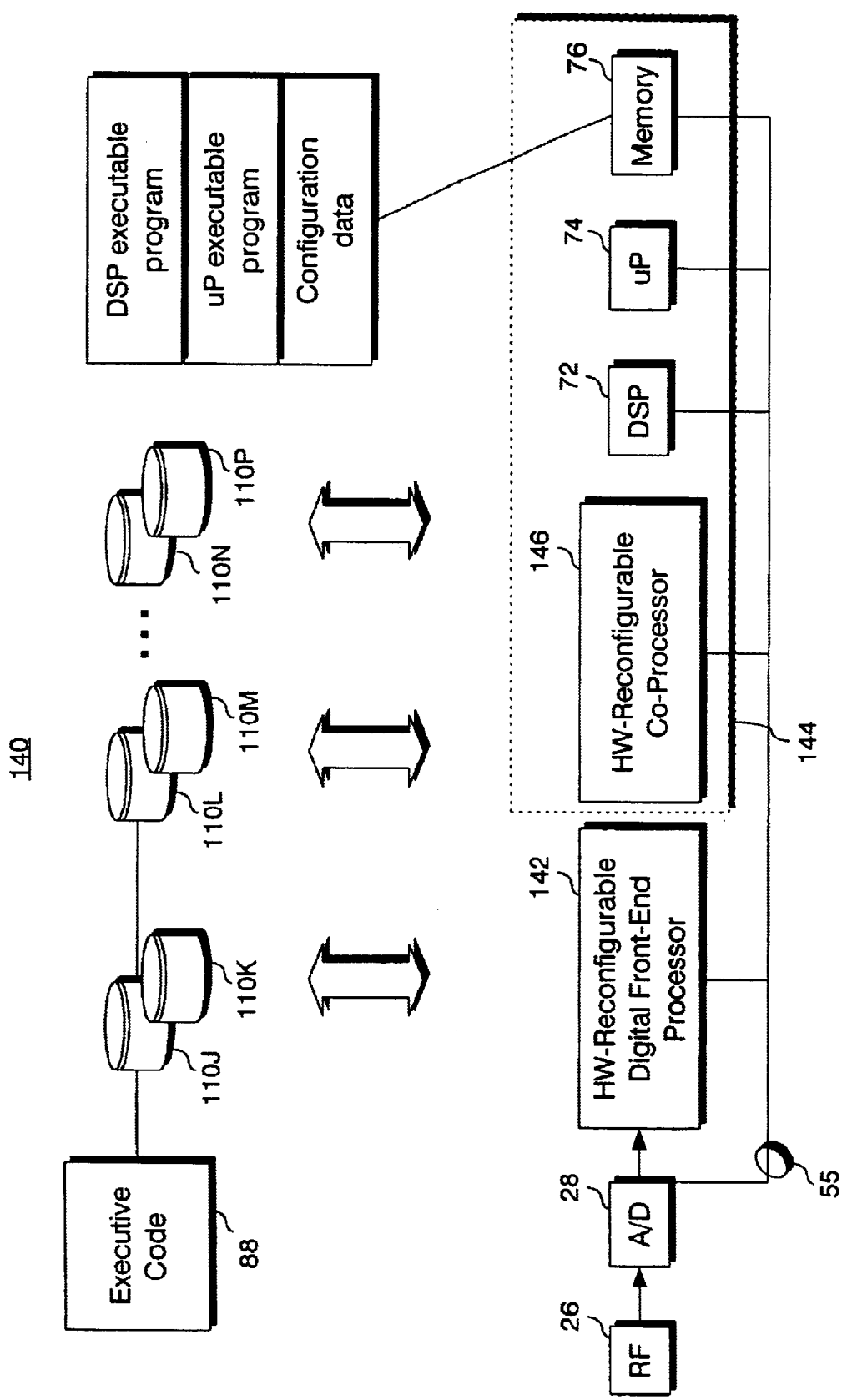
FIG. 6 illustrates the application of heterogeneous reconfigurable multiprocessing hardware of the invention to a communication system.

An example mapping of the Digital Front End Processor, Detector/Demodulator and Parameter Estimator of FIG. 1 onto the architecture of FIG. 4A is given in FIG. 6. This figure illustrates a digital communication modem 140 that may be implemented in accordance with an embodiment of the invention. A transmitter transmits a signal to a channel, which may be a wireless or physical channel. The transmitted signal is received at the modem 140, where it is initially processed by a Radio Frequency (RF) subsystem 26. The RF subsystem 26 performs analog mixing, analog filtering, and analog gain control functions. The analog signal from the RF subsystem 26 is then converted to an equivalent digital signal with the analog-to-digital converter 28.

The output from the RF subsystem 26 is one or more bandpass signals (intermediate frequency signals), which are then digitized by the analog-to-digital converter 28, which is typically implemented as a free-running analog-to-digital converter. The output from the analog-to-digital converter 28 is placed on a bus 55, which may be reconfigurable. Signals from the bus 55 are routed to the hardware-reconfigurable digital front-end processor 142. Preferably, the reconfigurable processor 142 is implemented with a heterogeneous reconfigurable multiprocessor as discussed above.

The reconfigurable digital front-end processor 142 performs channel selection, sample-rate conversion, digital down-conversion, and digital filtering. This is achieved through the use of multi-rate digital signal processing techniques, software-programmable filter coefficients, rate-conversion, channelization, and loop filter parameters, The output of reconfigurable processor 142 consists of complex in phase and quadrature (IQ) signals, which are then fed to a demodulation-detection-parameter estimation processor 144. The functionality of processor 144 is distributed between the software-programmable digital signal processor 72, the control microprocessor 74, and the hardware-reconfigurable co-processor 146.

Processor set 144 performs demodulation/detection functions including but not limited to despreading, descrambling, dechannelizing, searching, and integrate-and-dump detection. Processor 144 also performs parameter estimation functions including but not limited to channel estimation, correlation, pilot-signal searching, frequency-offset estimation, phase-offset estimation, and timing-error estimation. Through a profiling methodology discussed below, highly computation-intensive aspects of parameter estimation are allocated to the hardware-reconfigurable co-processor 146, while the balance of computations is allocated to the DSP microprocessor 72 and control microprocessor 74. For example, in a code-division-multiple-access (CDMA) application, high-speed chip-rate processing is performed by co-processor 146, while lower-speed channel estimation is performed by DSP 72.

Co-processor 146 is architecturally distinct from processor 142 due to the autonomy of the respective signal processing functions, as well as differences in sample rates and other factors. The output from hardware-reconfigurable co-processor 146 is fed to the bus 55, which interfaces with the digital signal processor 72, control microprocessor 74, and memory 76. Memory 76 includes segments for the executable code for DSP 72, control microprocessor 74, and for hardware and other configuration. The digital signal processor 72 and microprocessor 74 are completely software programmable, and offer the most flexibility with respect to which applications can be executed on the architecture.

Processor 144 thus performs traditional inner receiver functions, which can be called via software routines from an instruction set processor. Thus, processor 144 is primarily software-programmable with requisite hardware reconfigurability, primarily with respect to dataflow between estimators and signal conditioning elements.

Figure 7:
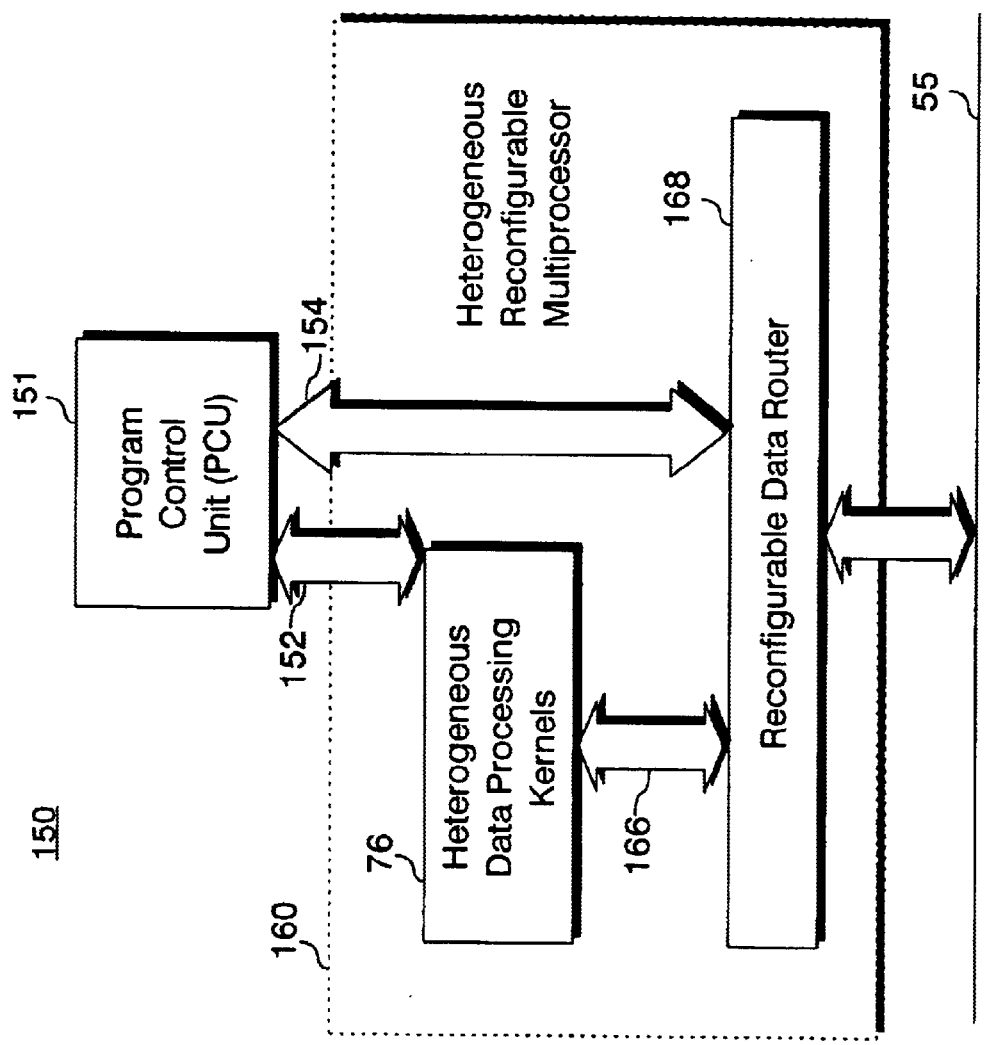
FIG. 7 illustrates a heterogeneous reconfigurable multiprocessing hardware architecture in accordance with an embodiment of the invention.

FIG. 7 illustrates an architecture 150 in accordance with an embodiment of the invention. The architecture 150 includes a Program Control Unit (PCU) 151 which stores instructions and data. A heterogeneous reconfigurable multiprocessor 160 performs computationally intensive signal/data processing functions, and is representative of either the hardware-reconfigurable digital front-end processor 142, or of the hardware-reconfigurable co-processor 146 of FIG. 6. The heterogeneous reconfigurable multiprocessor 160 is comprised of a set of heterogeneous data processing kernels 162 and a reconfigurable data router 168. The configuration of the heterogeneous data processing kernels 162 is determined by control bus 152, while the configuration of data router 168 is determined by control bus 154.

The data flow and control flow computation kernels 162 are of varying granularity, from simple arithmetic operators, such as adders and multipliers, to more complex data flow/control flow operations, such as a complete Viterbi Algorithm Add-Compare Select and Fast Fourier Transform Butterfly units. The composition of computation kernels 162 is further discussed below.

Figure 8:
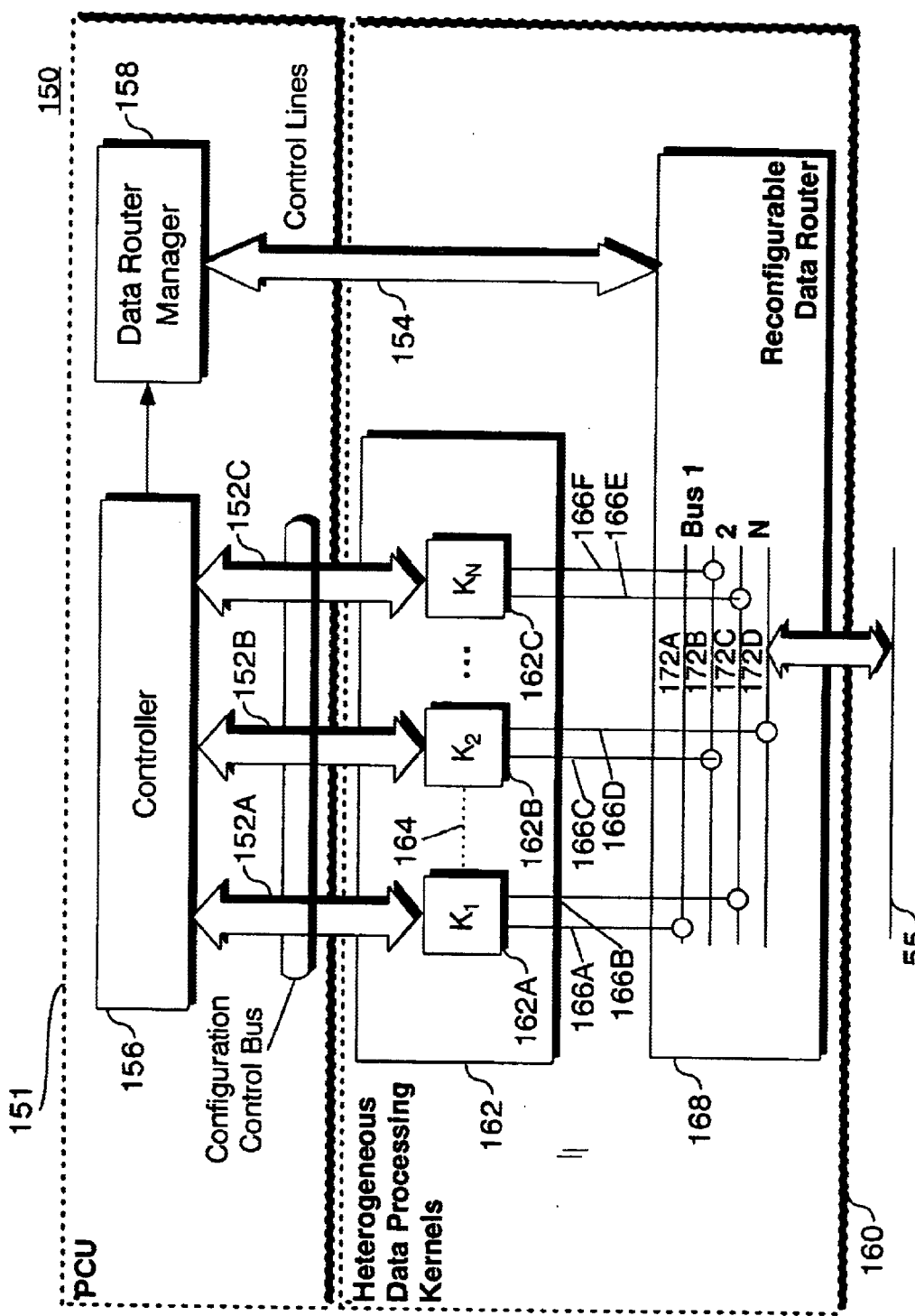
FIG. 8 illustrates a detailed embodiment of the architecture of FIG. 7.

FIG. 8 illustrates architecture 150 in greater detail. The PCU 151 receives a module of executive code 88 from microprocessor 74 of FIG. 6. The executive code is a segment of the microprocessor executable programs stored in memory that orchestrates overall configuration and functionality. A controller 156 configures a set of quasi-fixed-function logic kernels 162A–C. In a typical application, the executive code 88 executes on the control microprocessor 74 or DSP microprocessor 72, and the functionality of controller 156 is allocated to the microprocessors and associated peripherals such as memory and various bus interfaces. FIG. 8 further illustrates that individual kernels may be interconnected either directly, as per representative path 164, or via reconfigurable data router 168. Reconfigurable data router 168 further receives input data from and delivers output data to bus 55. Reconfigurable data router 168 is controlled by the data router manager 158 via control bus 154, and in turn via controller 156 and executive code 88 of FIG. 4A.

The portfolio of kernels 162 is determined by first profiling the applications of interest, as discussed below. Kernels 162 are compute engines, and their nature as well as that of their interconnection is governed by any bit-slice, nibble-slice, and word-slice routing control mechanism, including, but not limited to, a programmable bus. A preferred canonical architecture for the kernels 162 is depicted in FIG. 9A. A configurable arithmetic logic unit (ALU) 186 performs the necessary signal processing operations. A local memory 182 serves as a high-speed cache. Data Sequencer 184 orchestrates the flow of data between local memory 182 and ALU 186. For further illustration, FIG. 9B shows several representative or available configurable architectures that may be implemented by one or more kernels 162. Kernels 162 can be reconfigured via control lines 152 to determine what operations are possible. Similarly, the reconfigurable data router 168 of FIG. 8 can be controlled to effectively re-order the sequence of signal processing operations performed by kernels 162.

Processor 160 can be reconfigured on a time-scale optimal for the application. For example, the mobile terminal of a user who roams from one geographic region to another having a different radio standard may be required to reconfigure over a period of seconds or minutes. On the other hand, the mobile terminal of a user who requests a real-time change of service, e.g., videoconference following from a voice connection with a common party, may be required to reconfigure in milliseconds or faster.

During execution, the architecture 160 operates as a heterogeneous (since the processors are not identical) multiprocessing (since there are multiple processing units) machine, with at least two concurrently operating processing units. Based on the selection of kernels 162, an augmented instruction set is defined for the heterogeneous reconfigurable multiprocessor 160. This augmented instruction set can be created, for example, by using a wide-word instruction by appending bits to an existing instruction word, with the new bit fields exclusively devoted to the decoding of instructions for the control and data flow for the heterogeneous reconfigurable multiprocessor. The instruction word, when decoded, feeds control units 156 and 158 of FIG. 8. Controller 156 performs the role of taking the decoded instruction fields and configuring the kernels 162 and reconfigurable data router 168, via data router manager 158. The control of the reconfigurable data router 168 is effected via a control word, which, in a preferred implementation, is a bit field extracted from the instruction word.

Figure 10:
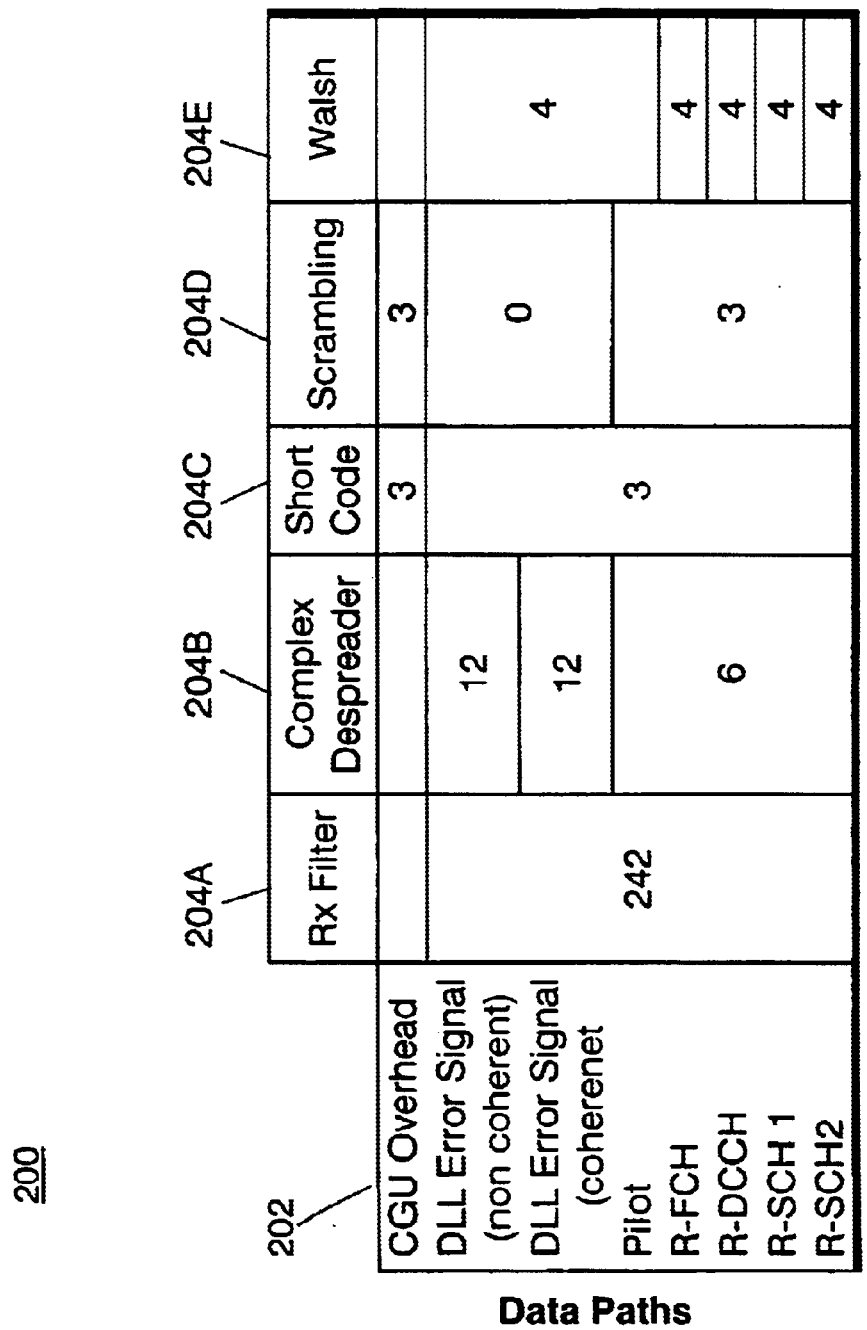
FIG. 10 illustrates profiling of computationally intensive functions in accordance with an embodiment of the invention.

The heterogeneous reconfigurable multiprocessor 160 is designed according to a method referred to as profiling. Profiling includes the first step of surveying all signal processing and control functions required to accommodate the standards, applications, and/or services of interest. The most computationally intensive of these functions are then targeted to the heterogeneous reconfigurable multiprocessor 160, while the remaining functions are targeted to the DSP microprocessor 72. Typically, computational intensity is enumerated in units of millions of operations per second (MOPS). For example, FIG. 10 depicts function 204A which could be provided by the hardware reconfigurable processor 142, functions 204B–E to be provided by coprocessor 146, and corresponding MOPS required by each function 204. These metrics are calculated for the various pertinent signal processing datapaths.

Additionally in this step, computationally intensive functions are further categorized according to type of operation, e.g., arithmetic/logical, control, and memory access. For each category, characteristic power per MOPS is determined for hardware or software implementation from vendor data, analysis, or other means. Power, e.g., milliwatts, required per function is thereby characterized for implementation in both reconfigurable hardware or in software (i.e., running on a processor whose power-per-MOPS has been characterized). In addition, the corresponding code size (and therefore memory requirement) for software implementation is determined. From the above, and from budgeted power and memory resources, allocation of processing operations to hardware and software processors can be determined.

The entries in spreadsheet 200 correspond to static operation for a particular standard, i.e., to a specific time within a dynamic operational scenario. The analysis of FIG. 10 must be repeated as necessary to reflect important temporal variations during representative/realistic scenarios for all standards, applications, and/or services of interest. The results of these analyses must be interpreted to reveal additional critical metrics of computational intensity, including for example but not restricted to average and peak MOPS for each relevant operation. This enables the requisite specifications for the hardware and software processing resources to be further evaluated.

The second step of profiling involves analysis of commonality of signal processing functions across the standards, applications, and/or services of interest. This is represented by example in FIG. 11. Included in abridged spreadsheet 220 are representative standards/applications, and respective relevant signal processing functions within the general category of parameter estimation. FIG. 11 shows, for example, that a Windowed Average Energy Estimator is required by seven of the listed standards. The designer would research the respective requirements of each of these seven standards to determine the required superset and seven subsets of functionality.

Figure 12:
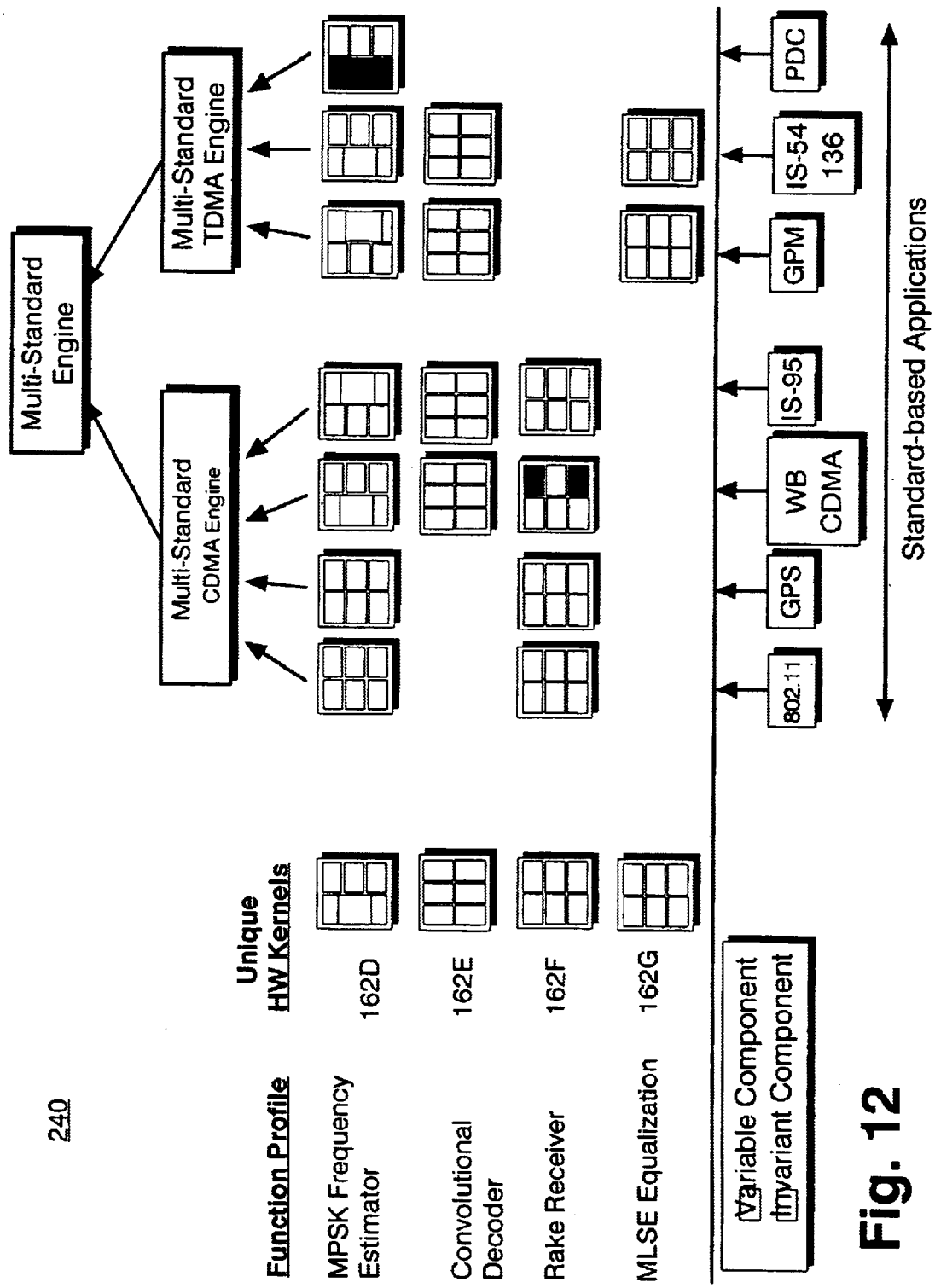
FIG. 12 illustrates the characterization of data processing kernels with variable and invariant components in accordance with an embodiment of the invention.

The third profiling step, defining the data processing kernels necessary to serve the standards, applications, and/or services of interest, is shown conceptually in FIG. 12 for a different set of standards. In general, each unique type of kernel includes a combination of variable and invariant functionality. The invariant component is determined by the above steps to be common across the standards, applications, and/or services of interest, while the variable functionality is that determined necessary to adapt to the various standards, applications, and/or services of interest. Each kernel is designed to include sufficient control and interface functionality to permit reconfiguration according to the end operational scenario.

Figure 13A:
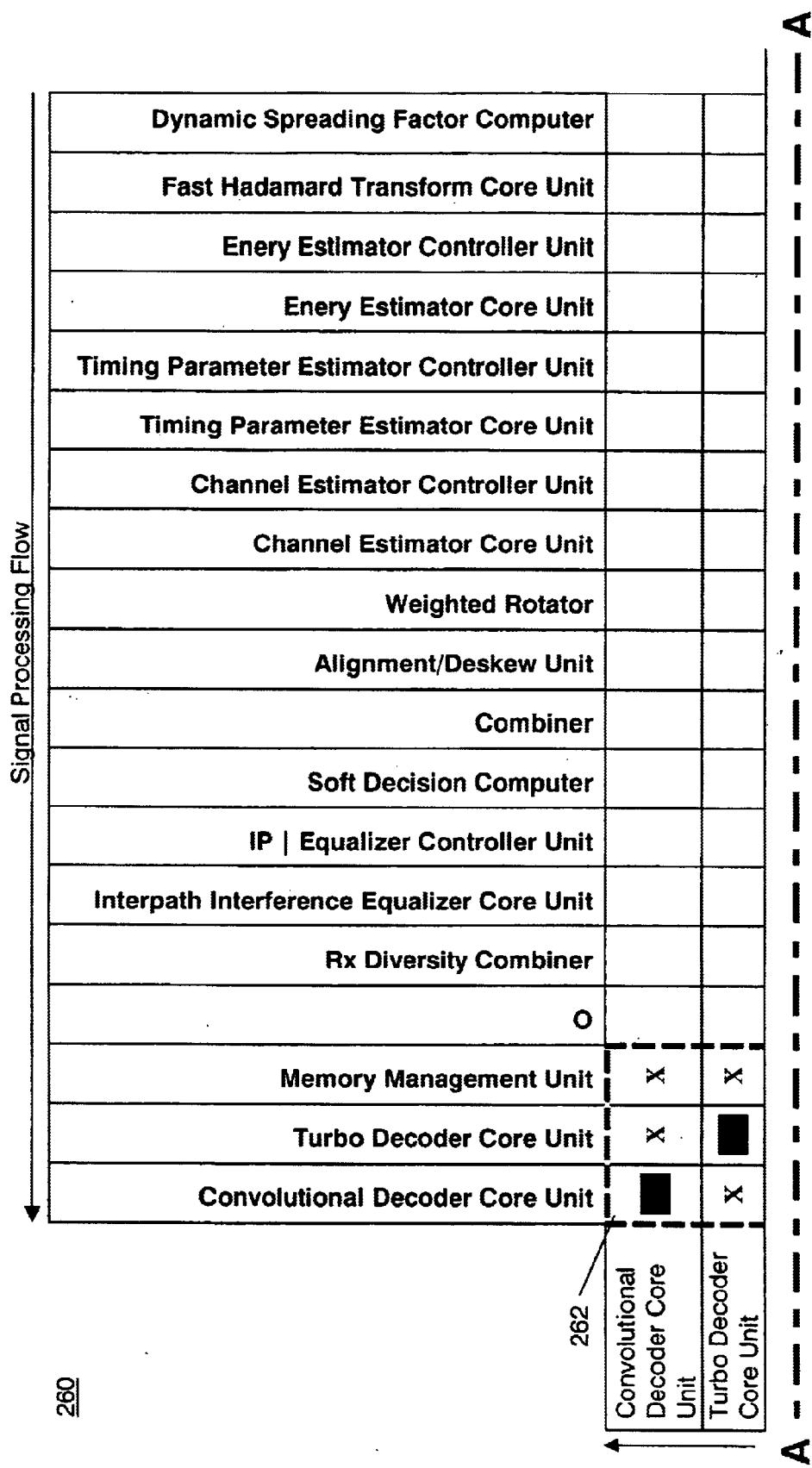
FIG. 13 illustrates profiling data flow among data processing kernels in accordance with an embodiment of the invention.
Figure 13B:
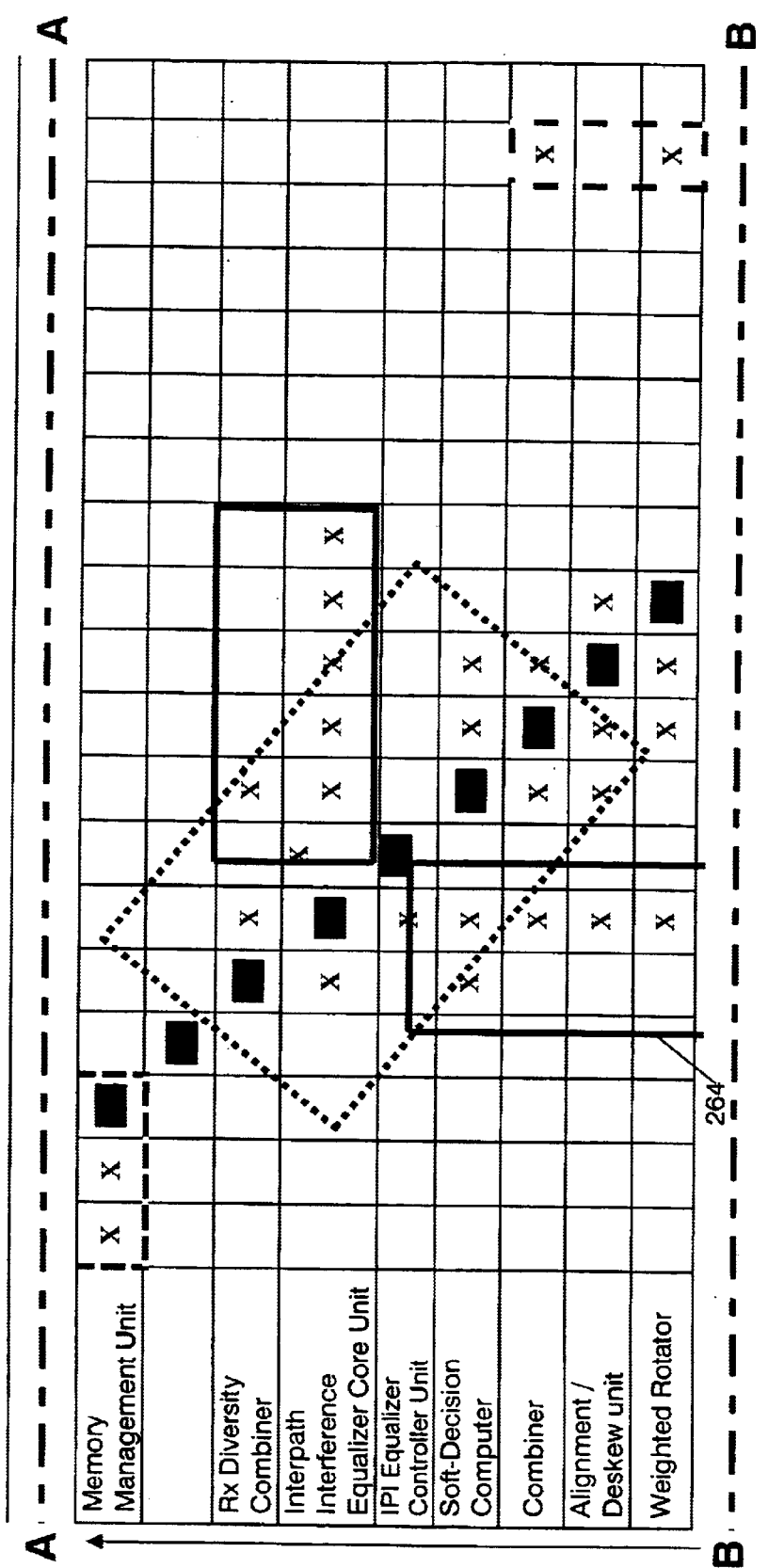
Figure 13C:
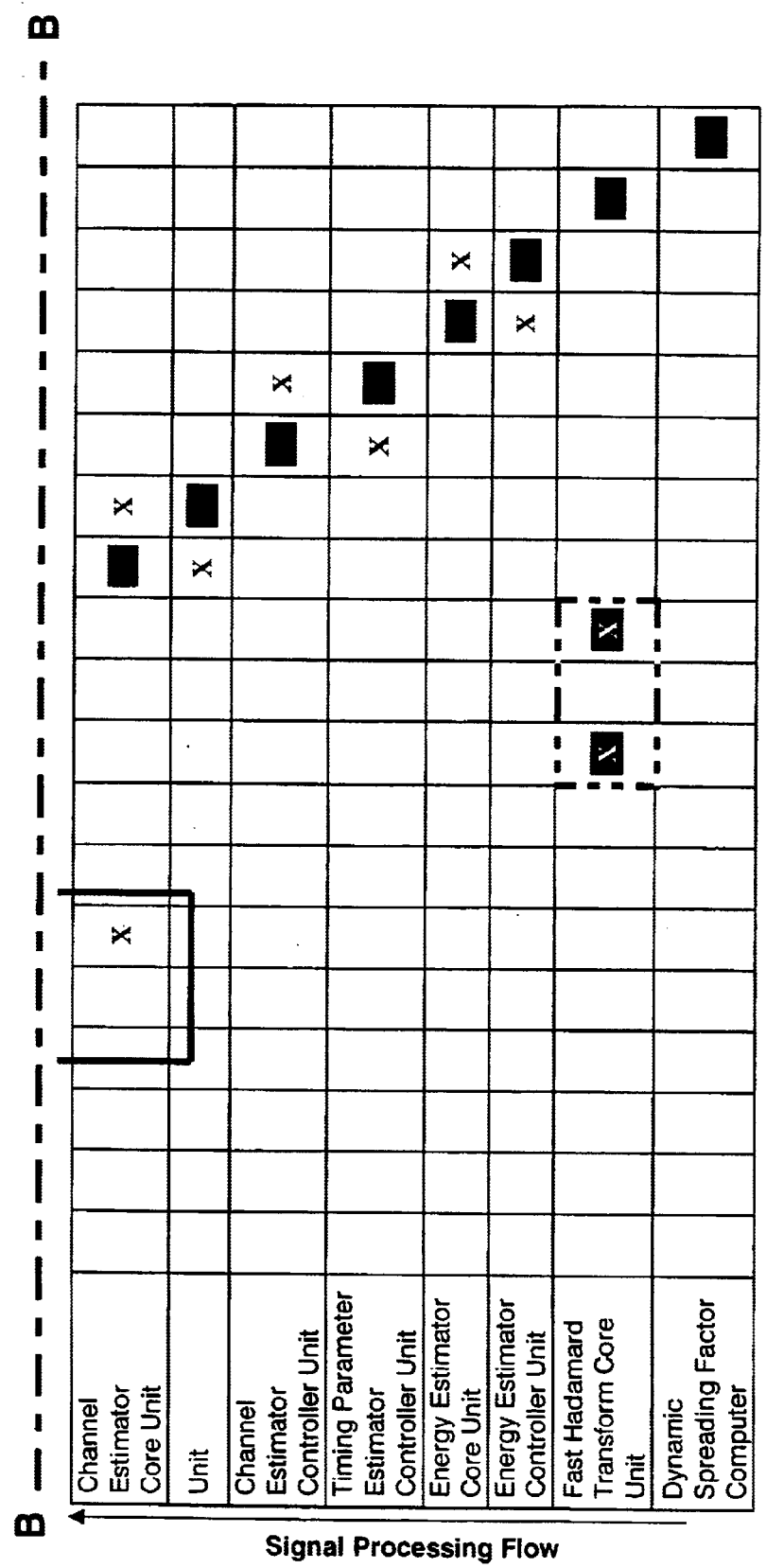

The interconnection of kernels must also be determined from profiling as shown in the example abridged matrix 260 of FIG. 13. The rows and columns of matrix 260 show a representative set of hardware signal processing kernels that have been defined according to the above profiling steps, along with all connections necessary to serve a representative set of CDMA-based wireless communication standards. Along the axes of matrix 260, signals generally flow from bottom to top, or from right to left, with exceptions as indicated. Each cell containing an "X" represents a required interface between the respective kernels. It can be seen that in the vicinity of the diagonal, interconnections are tightly clustered, as for example cluster 262. Other types of interconnections include parallel connections, e.g., 264, and isolated connections, e.g., 266. Where common across all standards, applications, and/or services of interest, these interconnections are made directly, as represented by connection 164 of FIG. 8. Conversely, connections that must change as a function of standard etc. must be effected by the reconfigurable data router 168 of FIG. 8.

This analysis reveals certain considerations of interest to the implementation designer. For example, in matrix 260, cluster 262 indicates short connections in the silicon implementation, while cluster 266 indicates longer connections. Cluster 264 indicates a set of parallel connections.

To summarize, reconfiguration of multiprocessor 160 is effected by i) selection of hardware processing kernel types, ii) control of the variable kernel functionality, and iii) control of the reconfigurable data router 168.

Once the kernel types and interconnections have been determined, the multiplicity of each kernel type needs to be determined, as illustrated in FIG. 14. A kernel pool 280 includes a sufficient number of each type of kernel to permit the assembly of multiple datapaths 290. In turn, a sufficient multiplicity of datapaths 290 is assembled to accommodate the signal processing requirements of a particular standard, service or application. This is illustrated for a number of representative applications and/or products 300. The portfolio 300A–D can represent either a single product having multi-mode/standard/application capability, or multiple, separate products based on common underlying hardware and software resources.

Thus, a manufacturer can enjoy mass customization based on a common product "platform." Initial or subsequent configuration can be performed in the factory, at point-of-sale, or by the user after delivery. Post-delivery customization can be based upon any of a number of techniques, including but not limited to smart card, wired interface, and over-the-air/over-the-network download and billing.

In FIG. 14, the various kernels 162 are interconnected by the reconfigurable data router 168 of FIGS. 7–8. For simplicity, however, reconfigurable data router 168 is not shown in FIG. 14.

For convenience, the above discussion has utilized examples relating to wireless communication systems. The principles discussed apply directly to other applications including but not limited to multimedia, security, and networking. Furthermore, the receive path only has been illustrated; the apparatus and method of the invention apply directly to the transmit path.

Those skilled in the art will recognize a number of benefits associated with the disclosed architecture. The architecture provides the ability to reconfigure a single product platform for multiple standards, applications, services, and quality-of service, instead of developing multiple hardware platforms to establish the same collective functionality. The architecture also provides the ability to use software programming techniques to reduce product development time and achieve rapid and comprehensive product customization. Thus, new services can be provided via software upgrades. The apparatus of the invention allows a network operator or service provider to control a communication terminal's capabilities. Equipment manufacturers may exploit the invention to create software-defined communication appliances.

Advantageously, the architecture of the invention optimally combines fixed-function and reconfigurable logic resources. The system has reconfigurable control and data paths. The invention extends the performance efficiency of microprocessors and digital signal processors via the augmentation of data paths and control paths through a reconfigurable co-processing machine. The reconfigurability of the data path optimizes the performance of the data flow in the algorithms implemented on the processor.

The architecture efficiently redirects functions previously running on a Fixed Function Data Arithmetic Logic Unit to a more flexible Heterogeneous Reconfigurable Multiprocessing Unit. The invention does not depend upon the fine-grained reconfigurability of existing programmable logic devices, and so does not have the problem of such devices of the area and power of the chip being dominated by the routing resources. Furthermore, the invention does not substantially rely on instruction-set programmable processors. Instead, a quasi-fixed set of computational resources that span the signal processing requirements of the standards, applications, and/or services of interest are configured together in a reprogrammable manner. This architecture can be applied to implement signal processing and/or control of processing applications. Ideal applications include but are not limited to digital communication, networking, encryption/security, and multimedia applications.

The invention reduces product development time via the use of a reconfigurable processor that is programmable via a high-level language. This avoids the problem of having to create new processors each time the algorithms considered for new applications change or push the performance envelope of existing processor architectures. The invention enables mass customization of relevant consumer and infrastructure products.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in over to best explain the principles of the invention and its practical applications, the thereby enable others skilled in the art to best utilize the invention and various embodiments with various modifications as are suited to the particular use contemplated. It is intended that the scope of the invention be defined by the following claims and their equivalents.

What is claimed is:

1. A digital wireless communication device, comprising:
   a radio-frequency (RF) subsystem;
   an analog-to-digital converter for converting analog signals from said RF subsystem to digital signals;
   a software-programmable processor;
   a heterogeneous reconfigurable multiprocessor for processing said digital signals; and
   a bus connecting said software-programmable processor and said heterogeneous reconfigurable multiprocessor.

2. The digital wireless communication device of claim 1 wherein the software-programmable processor is selected from the group comprising a digital signal processor and a central processing unit.

3. The digital wireless communication device of claim 1 wherein said software-programmable processor executes a set of software modules specifying a set of wireless communication applications, standards, and services to be implemented.

4. The digital wireless communication device of claim 1 wherein said heterogeneous reconfigurable multiprocessor comprises a plurality of programmable data processing kernels, each data processing kernel of said plurality of data processing kernels including a data sequencer, a local memory, and an arithmetic logic unit.

5. The digital wireless communication device of claim 4 wherein said plurality of programmable data processing kernels are programmed to implement a set of wireless communication applications, standards, and services.

6. A method of programming a digital wireless communication device to support a wireless communication application, standard, and service, said method comprising the steps of:
   selecting a set of parameters and values required to implement a specified wireless communication application, standard, and service;
   downloading said set of parameters and values to a digital wireless communication device including a heterogeneous reconfigurable multiprocessor with a plurality of re-programmable data processing kernels; and
   operating said plurality of re-programmable data processing kernels in accordance with said set of parameter and values to support said specified communication application, standard, and service.

7. The method of claim 6 wherein said selecting step includes the step of selecting a set of parameters and values from the group comprising: a country of operation, a frequency band, and a data rate.

8. The method of claim 6 wherein said downloading step includes the step of downloading said set of parameters over a wireless communication channel.

9. The method of claim 6 wherein said downloading step includes the step of downloading said set of parameters at the time of manufacture.

10. The method of claim 6 wherein said downloading step includes the step of downloading said set of parameters at a point of sale.

11. A mobile digital wireless communication device, comprising:
    a radio-frequency (RE) subsystem to digital signals;
    an analog-to-digital converter for converting analog signals from said RF subsystem to digital signals;
    a software-programmable processor;
    a heterogeneous reconfigurable multiprocessor for processing said digital signals;
    a memory, including:
        executive code that is executable on the software-programmable processor; and
        a set of platform-dependent software modules specifying a set of wireless communication applications, standards, and services, wherein a subset of the software modules is executable on the heterogeneous reconfigurable multiprocessor; and
    a bus connecting said analog-to-digital converter, software-programmable processor, and heterogeneous reconfigurable multiprocessor.

* * * * *